J. A. NEWELL & A. LUCASSE.

Method and Means for Seating Foot Valves in Pumps.

No. 9,334. Reissued Aug. 3, 1880.

Attest:

A. Barthel

Rico. S. Day

Inventor:

J. A. Newell

Ary Lucasse

By Atty.

Thos. S. Sprague.

N. PETERS, PHOTO-LITHOGRAPHER, WASHINGTON, D. C.

UNITED STATES PATENT OFFICE.

JOHN A. NEWELL AND ARY LUCASSE, OF KALAMAZOO, MICHIGAN.

METHOD AND MEANS FOR SEATING FOOT-VALVES IN PUMPS.

SPECIFICATION forming part of Reissued Letters Patent No. 9,334, dated August 3, 1880.

Original No. 195,153, dated September 11, 1877. Application for reissue filed November 3, 1879.

*To all whom it may concern:*

Be it known that we, JOHN A. NEWELL and ARY LUCASSE, of Kalamazoo, in the county of Kalamazoo and State of Michigan, have invented an Improvement in Methods and Means for Seating Foot-Valves, of which the following is a specification.

Our invention relates to improvements in pumps; and it consists in the method hereinafter described of forming a valve-box seat and seating the valve therein after the tube has been driven, and also in certain devices for carrying out this method, as hereinafter more fully set forth and pointed out in the claims.

The object we have in view is to furnish a means for accurately reaming the seat preparatory to seating the valve-box, and to accurately seat the latter in position, and to so construct the foot-valve box as to adapt it to be so seated in position; and to this end we employ two short nipples screwed onto the lower end of a rod, and coupled by couplings which fit the bore of the pipe and serve as guides; or we employ what is known as a "reducing-coupling," having threads of different sizes and a single nipple, connecting the reducing-coupling to a common coupling, and these couplings fit the bore of the pipe as before, to form guides.

The projecting end of the lower coupling is threaded to receive a screw-shank on a reamer that reams a seat in the well for the tapered valve-box, which is also provided with a screw-shank to attach it to the rod while being seated, after which the rod is unscrewed from it, leaving it in position.

Figure 1:
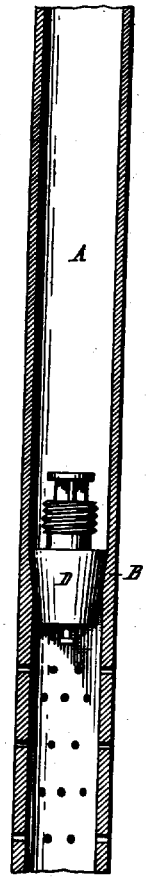
Figure 2:
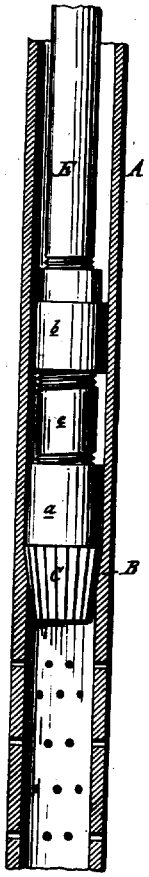
Figure 3:
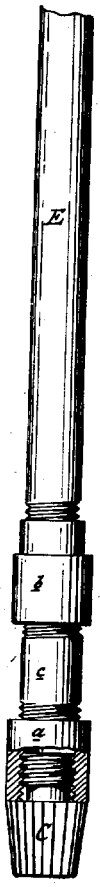
Figure 4:
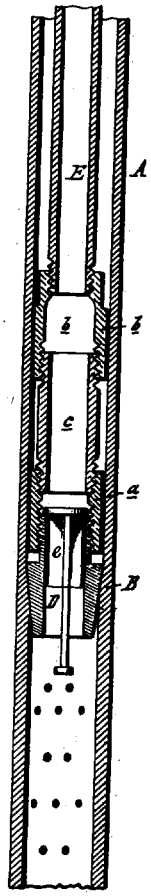

Figure 1 is a vertical section of the lower end of a tube-well, showing the valve-box seated. Fig. 2 is a sectional elevation, showing the tools for and manner of reaming out the valve-box seat. Fig. 3 is an elevation of the rod with the reamer attached or screwed on. Fig. 4 is a vertical section of the well and tool, showing the manner of seating the valve-box.

In the accompanying drawings, which form a part of this specification, A represents the lower end of a tube-well, the lower extremity of which is perforated to admit the water. The walls of this perforated end are made thicker than the rest of the tube, reducing that part of the bore leaving a shoulder, B, at the top in which to seat a tapered valve-box, D. This box is tapered on the outside, as shown in Fig. 4, and terminates at top in an annular shank, the outside of which is provided with a male thread, as shown, and for the purposes hereinafter described.

The tube-well is driven in the usual way, after which the tapering seat B is prepared to receive the valve-box by the reamer C, having a corresponding taper, and a screw-shank, by which it is fastened to the end of a coupling-socket, *a*, at the end of a short nipple, *c*, which is coupled to a reducing-coupling, *b*, that is screwed onto the lower end of a light rod or tube, E.

The couplings *a b* fit snugly the bore of the well-tube, so that when sent down and rotated the reamer will be guided by them in the axis of the well while reaming a tapered seat at the shoulder B, after which the tool is withdrawn, the reamer removed, and the shank of the valve-box D is screwed into the socket-coupling *a*. The valve-box is then lowered into the tube and guided fairly into its seat, when a few taps on the top of the tube E sets it fast, after which the tube E is unscrewed from the valve-box and withdrawn from the well.

It will be seen that the valve *e* here employed is of the long-stemmed variety, which admits of the use of the valve-box without anything above it to retain the valve in place, and that by the use of this box and valve nothing is required to keep the valve in its place.

What we claim as our invention, and desire to secure by Letters Patent, is—

1. The method herein described of forming a valve-box seat and seating the valve therein after the tube has been driven, which consists in first driving the well-tube, then reaming the tubing to form a valve-box seat, next removing the reamer from the coupling and inserting into it the valve-box, returning the coupling with the valve-box into the tube, then seating the valve, and finally removing the coupling, substantially as described.

2. The socket-couplings *a b* and nipples *c*, in combination with the tube E, for guiding a reamer in forming a seat for a valve-box, D, and for guiding the latter into its seat, substantially as set forth.

JOHN A. NEWELL.
ARY LUCASSE.

Witnesses:
GEO. H. CHANDLER,
E. W. DE YOE.